March 31, 1942.    L. R. RUNALDUE    2,278,151
REGULATING APPARATUS
Filed Dec. 11, 1940

Inventor:
Lewis R. Runaldue,
by Harry E. Dunham
His Attorney.

Patented Mar. 31, 1942

2,278,151

UNITED STATES PATENT OFFICE 2,278,151

REGULATING APPARATUS

Lewis R. Runaldue, Pittsfield, Mass., assignor to General Electric Company, a corporation of New York Application December 11, 1940, Serial No. 369,601

1 Claim. (Cl. 171—242)

My invention relates to electric regulators, and more particularly to electric regulators of the static type for controlling alternating current supply circuits to obtain a desired operating condition of a load circuit or load device energized from the supply circuit.

Static regulators of the variable impedance type have been devised which utilize a saturable core reactor provided with direct current control winding for controlling the core saturation and impedance of the reactor. Regulators of this type while satisfactory for some purposes have a somewhat limited range of impedance variation.

It is an object of my invention to provide an improved electric regulator of the static type.

It is a further object of my invention to provide a regulator of the series impedance type which has an increased range of impedance variation.

It is a still further object of my invention to provide a regulator employing a saturable reactor having means for preventing hunting or overshooting of the regulator.

Further objects and advantages of my invention will become apparent as the following description proceeds and the features of novelty which characterize my invention will be pointed out with particularity in the claim annexed to and forming a part of this specification.

In accordance with the illustrated embodiment of my invention an alternating current supply circuit is controlled by varying the impedance of a network connected in series therewith to obtain a desired operating condition of a load or load device energized from the supply circuit. The network comprises a parallel connected capacitor and saturable reactor and the impedance of the network is changed by varying the inductance of the reactor. An anti-hunt winding operating in conjunction with the reactor control winding is provided to prevent hunting or overshooting of the regulator.

Figure 1:
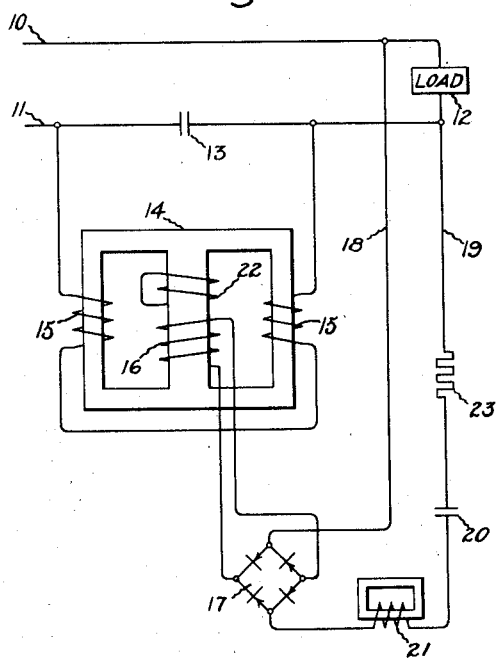
Figure 2:
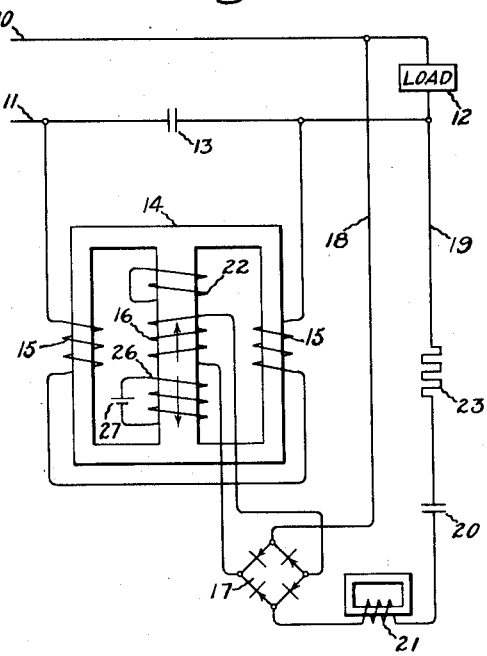
Figure 3:
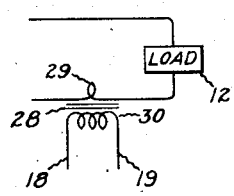

My invention will be better understood from the following description taken in connection with the accompanying drawing in which Fig. 1 illustrates in diagrammatic form one embodiment of my invention, and Figs. 2 and 3 are modifications of the arrangement shown in Fig. 1.

Referring to Fig. 1 of the drawing, an alternating current supply circuit comprising the conductors 10, 11 is connected to supply a load or load device 12. Connected in series with the supply circuit is a network comprising a parallel connected capacitor 13 and a saturable reactor 14. The reactor 14 is provided with an iron core having three legs arranged as shown in the drawing and the reactor winding 15 is divided into two sections arranged on the outer legs. Control windings 16 and 22 are arranged on the center leg of the reactor for the purpose of controlling the saturation of the reactor core and the arrangement is such that normally there is practically no magnetic coupling between the reactor winding 15 and the control windings due to the fact that the alternating magnetic flux produced by the two sections of the reactor winding confines itself to the outer legs of the reactor core. The control winding 16 is supplied with direct current from the output terminals of a rectifier 17. The input terminals of the rectifier 17 are connected to a control circuit comprising the conductors 18 and 19 and the control circuit is supplied with an alternating current, the magnitude of which varies as a function of the regulated condition of the load or load device. As illustrated in Fig. 1 the conductors 18 and 19 are connected across the load 12 so that the current in the control circuit varies in accordance with the load voltage which is, in this illustration, the controlled condition of the load. The sensitivity of the control circuit may be increased by the inclusion of a ferro-resonant combination comprising a series-connected capacitor 20, a saturable inductance 21 and a resistor 23. It will be understood, however, that these latter-mentioned elements are not essential to the operation of my regulating apparatus.

In order to prevent any tendency of the regulating apparatus to "overshoot" or "hunt" I have provided the reactor 14 with a second control or anti-hunt winding 22, the terminals of which are connected together to form a short-circuited winding. The action of this anti-hunt winding will be described below.

The impedance of the network comprising the parallel connected capacitor 13 and reactor 14 depends upon the relative impedances of the capacitor and reactor. Thus, if the inductive reactance of the reactor 14 equals the capacitive reactance of the capacitor 13, the network will be in a resonant condition and its impedance will approach infinity. If the inductive reactance of the reactor 14 is either increased or decreased from the resonant value, the impedance of the network is decreased. In the illustrated embodiments of my invention the impedance of the network is controlled by varying the energization of the control winding 16 of the saturable reactor which in turn varies the inductive reactance of the reactor.

In the arrangement illustrated in Fig. 1 the regulating apparatus is arranged to maintain constant voltage supplied to the load 12 from the alternating current supply conductor 10, 11. In operation let it be assumed that the inductive reactance of the reactor 14 is greater than the capacitive reactance of the capacitor 13 and the impedance of the network is such that the desired voltage is supplied to the load 12. If the voltage across the load 12 now increases the voltage across the conductors 18 and 19 of the control circuit will also increase causing an increase in current in the control circuit. By the use of the ferro-resonant combination comprising the capacitor 20 and the saturable inductance 21 the current in the control circuit may be made to increase at a much greater rate than the load voltage. In other words, the ferro-resonant combination amplifies the current changes in the control circuit. The increase in control circuit current results in an increase in the current passing through the control winding 16 which produces a flux tending to saturate the core of the reactor and thereby decrease the impedance and inductive reactance of the reactor winding 15. The decrease in the inductive reactance of the reactor causes it to approach the value of the capacitive reactance of the condenser 13 and hence the impedance of the network is increased. The increase in impedance of the network increases the voltage drop thereacross thereby lowering the voltage applied to the load 12 so that it returns to its desired value. Conversely, if the voltage across the load drops below the normal value, the current in the control winding 16 decreases which causes an increase in the inductive reactance of the reactor and a decrease in the total impedance of the network whereby the voltage supplied to the load is increased to the desired value. By the expedient of connecting a capacitor in parallel with the saturable reactor, the available range of impedance change of the regulator is materially increased over that which would be obtained by the use of the reactor alone.

Changes in current flowing through the control winding 16 do not immediately bring about a change in the total impedance of the control network. Thus, if the current in the control winding 16 suddenly increases, a current is induced in the anti-hunt winding 22 in a direction such that the flux produced by the winding 22 opposes that produced by the winding 16, the windings 16 and 22 being magnetically coupled through the center leg of the reactor core. However, if the current in the control winding 16 reaches a steady-state higher value, the current in the winding 22 drops to zero and the inductive reactance of the reactor is adjusted in accordance with the higher value of the current in the control winding 16. Conversely, if the current in the control winding 16 suddenly decreases a current in the anti-hunt winding 22 flows in a direction such that the flux produced by the winding 22 supplements the flux produced by the winding 16 and thereby prevents immediate decay of the saturating flux. However, if the winding 16 reaches a steady-state current value lower than the initial value, the current in the anti-hunt winding 22 drops to zero and the inductive reactance of the reactor 14 is adjusted in accordance with the new lower current value in the control winding 16. Thus the anti-hunt winding 22 acts as a damping device which tends to prevent hunting and overshooting of the regulator. The anti-hunting device permits the use of a very sensitive control circuit which would otherwise cause an undesirable hunting action in the regulator operation.

In the arrangement illustrated in Fig. 1, control is obtained by varying the value of the inductive reactance of the reactor 14 through a range of values all of which are greater than the capacitive reactance of the capacitor 13. Thus, the net current flowing through the network leads the voltage drop thereacross or, in other words the network draws a leading current.

In some cases it may be desirable to utilize regulating apparatus which draws a lagging rather than a leading current because of a certain operating characteristic of the load, for example, vapor lamp street lighting load circuits. In Fig. 2 of the drawing I have shown a modification of the control arrangement wherein the impedance network draws a lagging rather than a leading current. Referring to Fig. 2 of the drawing the control arrangement illustrated is generally the same as that shown in Fig. 1 and like parts have been given the same reference numerals. In the Fig. 2 arrangement, however, the impedances of the capacitor 13 and the reactor 14 are arranged so that the inductive reactance of the reactor 14 is always less than the capacitive reactance of the capacitor 13 whereby the network draws a lagging current. As the inductive reactance of the reactor is increased its value approaches that of the capacitive reactance of the capacitor and the circuit approaches a resonant condition causing the net impedance of the network to increase. Conversely, as the inductive reactance of the reactor is decreased, the network moves away from the resonant condition and its impedance decreases. It will be observed, however, that with this arrangement the relationship between the impedance of the reactor winding 15 and the total impedance of the network is just the reverse from that in the Fig. 1 arrangement. This necessitates a reversal in the relationship between the current in the control circuit and resulting impedance of the reactor 14. This is accomplished by the provision of an additional winding 26 on the center leg of the reactor 14 energized from a source of constant unidirectional current such as a battery 27. The ampere turns of the winding 26 are greater than the winding 16 and the flux produced by the winding 26 is in opposition to that produced by the winding 16 Hence, the magnetic flux which is effective to control the impedance of the reactor winding 15 is equal to the difference between the fluxes produced by the windings 26 and 16 and this difference value varies inversely with the flux produced by the control winding 16 and hence the correct relationship between the current in the control circuit and the inductive reactance of the reactor 14 is obtained. In other respects the Fig. 2 modification functions in the same manner as the Fig. 1 arrangement.

In the arrangements illustrated in Figs. 1 and 2 the conductors 18 and 19 of the control circuit are connected across a load so that the regulating apparatus functions to maintain a constant load voltage. However, the application of the regulating apparatus is not limited to maintaining constant load voltage but may be utilized to control other operating conditions of the load or load device 12 energized from the supply conductors 10, 11. For example, as illustrated in Fig. 3 the regulating apparatus may be utilized to control the current supplied to the load 12. To obtain current regulation of the load circuit the conductors 18 and 19 of the control circuit are energized from the secondary winding 30 of a current transformer 28 having its primary winding 29 connected in series with the load circuit. With this arrangement the regulating apparatus will function to maintain a constant current supplied to the load 12.

It will be apparent to those skilled in the art that my static regulating device may be connected in parallel relation with a load device, in these regulating systems depending upon a variable impedance in parallel relation with the load device for effecting regulation, without departing from my invention in its broader aspects.

While I have shown and described particular embodiments of my invention, it will occur to those skilled in the art that various changes and modifications may be made without departing from my invention, and I, therefore, aim in the appended claim to cover all such changes and modifications as fall within the true spirit and scope of my invention.

What I claim as new and desire to secure by Letters Patent of the United States is:

In combination, an alternating current supply circuit, a load circuit connected thereto, a variable impedance regulator for controlling an operating condition of said load circuit, said regulator comprising a capacitor connected in series with said supply circuit, a saturable reactor having a variable impedance alternating current winding and a saturating winding, said alternating current winding being connected in parallel with said capacitor, an alternating current control circuit connected to be energized in accordance with the value of said condition, means for supplying said saturating winding with a unidirectional saturating current variable in accordance with the current in said control circuit, a capacitor and a saturable inductance constituting a ferro-resonant combination in said control circuit for amplifying the current changes in said control circuit resulting from changes in the value of said condition whereby said regulator is highly sensitive in operation, and a closed circuit anti-hunting winding magnetically coupled with said saturating winding and arranged to oppose changes in the magnetic flux produced by said saturating winding for preventing hunting or unstable operation of said regulator arising from the amplification of the current changes in said control circuit.

LEWIS R. RUNALDUE.